(12) United States Patent
Bisht et al.

(10) Patent No.: US 11,546,416 B2
(45) Date of Patent: Jan. 3, 2023

(54) ROBUST MESSAGE PROCESSING FOR A SOFTWARE-DEFINED NETWORKING (SDN) CONTROLLER CLUSTER

(71) Applicant: TELEFONAKTIEBOLAGET LM ERICSSON (PUBL), Stockholm (SE)

(72) Inventors: Ashutosh Bisht, Bangalore (IN); Faseela K, Karnataka (IN); Muthukumaran Kothandaraman, Bangalore (IN); D Arunprakash, Bangalore (IN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 230 days.

(21) Appl. No.: 16/962,645

(22) PCT Filed: Jan. 20, 2018

(86) PCT No.: PCT/IN2018/050030
§ 371 (c)(1),
(2) Date: Jul. 16, 2020

(87) PCT Pub. No.: WO2019/142202
PCT Pub. Date: Jul. 25, 2019

(65) Prior Publication Data
US 2020/0351334 A1 Nov. 5, 2020

(51) Int. Cl.
*H04L 67/10* (2022.01)
*G06F 15/16* (2006.01)
(Continued)

(52) U.S. Cl.
CPC .............. *H04L 67/10* (2013.01); *G06F 15/16* (2013.01); *H04L 45/50* (2013.01); *H04L 69/14* (2013.01); *H04W 84/20* (2013.01)

(58) Field of Classification Search
CPC ......... H04L 67/10; H04L 45/50; H04L 69/14; G06F 15/16; H04W 84/20
See application file for complete search history.

(56) References Cited

U.S. PATENT DOCUMENTS

| | | | |
|---|---|---|---|
| 6,339,595 B1 * | 1/2002 | Rekhter | H04L 45/00 370/392 |
| 8,347,286 B2 | 1/2013 | Campbell et al. | |
| 2009/0213834 A1 * | 8/2009 | Amirijoo | H04W 60/00 370/352 |

FOREIGN PATENT DOCUMENTS

WO 2006103093 A2 5/2006

OTHER PUBLICATIONS

Open Networking Foundation, "OpenFlow Switch Specification," version 1.5.1 (Protocol version 0x06), ONF TS-025, Mar. 26, 2015, 283 pages.

* cited by examiner

*Primary Examiner* — Normin Abedin
(74) *Attorney, Agent, or Firm* — Christopher & Weisberg, P.A.

(57) ABSTRACT

Exemplary embodiments include methods and/or procedures for handling messages from one or more data-plane nodes (DPNs) to a plurality of controller nodes configured in a cluster, comprising: receiving a message from a DPN; tagging the message with an incarnation identifier (IID) associated with the DPN; and performing IID handling of the tagged message, which includes comparing a value of the IID of the tagged message with a value of a global IID associated with the DPN, discarding the tagged message if the value of the IID of the tagged message is less than the value of the global IID, and processing the tagged message if the value of the IID of the tagged message is not less than the value of the global IID. Exemplary embodiments also (Continued)

include controller nodes, controller clusters, and computer-readable media embodying operations of the exemplary methods and/or procedures.

18 Claims, 5 Drawing Sheets

(51) Int. Cl.
*H04L 45/50* (2022.01)
*H04L 69/14* (2022.01)
*H04W 84/20* (2009.01)

ROBUST MESSAGE PROCESSING FOR A SOFTWARE-DEFINED NETWORKING (SDN) CONTROLLER CLUSTER

TECHNICAL FIELD

The present application relates generally to the field of networking, and more specifically to software-defined networking (SDN) where the packet-forwarding functionality (e.g., data plane) is separated from the packet routing or switching process (e.g., control plane).

BACKGROUND

Software-defined networking (SDN) is an architecture addressing the goals and requirements of various modern high-bandwidth applications by providing dynamic, manageable, cost-effective, and adaptable networking configurations. In general, SDN architectures decouple network control functions—also referred to as "control plane" and packet switching and/or forwarding functions, also referred to as "data plane." This separation enables network control to be directly programmable and the underlying infrastructure to be abstracted from applications and network services.

The primary components of an SDN network are controller nodes (also referred to as "SDN controllers") and data-plane nodes (DPNs, also referred to as "switches" or, collectively, a "datapath") that handle the switching and forwarding of the data traffic under direction of the SDN controllers. Furthermore, SDN controllers are often logically-centralized entities that translate requirements of higher-layer applications into configuration of the DPNs that they control, while providing a simpler, more abstract view of the datapath to these applications. The interface to the SDN applications is often referred to as the SDN controller's "northbound interface." An exemplary northbound controller interface is OpenStack.

Similarly, the logical interface between an SDN controller and the controlled DPNs or switches is often referred to as the "southbound interface," Various standardized southbound interfaces are available, including the OpenFlo), (OF) protocol standardized and published by the Open Networking Foundation (ONF). Within the OF protocol, a Logical Switch comprises one or more flow tables and a group table, which collectively perform packet lookups and forwarding from input ports to output ports; and one or more OF channels to a controller. Via these channels, the controller can configure and/or manage the switch, such as by adding, updating, and deleting flow entries in flow tables, both reactively (e.g., responsive to packets) and proactively. A controller can also receive messages indicating or associated with events from the switch and send packets out to the switch via OF channels. A switch's control channel may support a single OF channel with a single controller or, in some implementations, multiple OF channels enabling multiple controllers to share management of a single switch.

For example, multiple controllers can be configured in a "high-availability" (HA) cluster, whereby one controller serves as a "master" of the connection from a switch to the cluster, and one or more other controllers are connection "slaves." In such a configuration, SDN controller nodes in the cluster can be front-ended by a load balancer proxy, which exposes a single virtual Internet Protocol (VIP) address used by the switches or DPNs to connect to the controller cluster. The proxy also can distribute incoming switch connections to controller nodes of the cluster based on some predetermined policy, such as round-robin.

One available (open-source) implementation of an SDN controller is the Open Daylight (ODL) controller, which can be configured as a three-node HA cluster. The three controller nodes can be configured in active-active redundancy model, in which switches can connect to any of the three controller nodes. FIG. 1 shows an exemplary arrangement of a ODL controller cluster 130 comprising a plurality of SDN controllers (SDNCs 140a-c) that are in communication with a plurality of switches (DPNs 110a-e) via a load balancer 135. The DPNs 110a-e include respective OF modules 120a-e, and the SDNCs 140a-c include respective OF modules 150a-c that can communicate with OF modules 120a-e according to the OF protocol, as briefly described above. In some embodiments, SDNCs 140a-c can include respective local data stores 155a-c that can be utilized for storage and retrieval of information that is specific (e.g., local and/or corresponding) to the respective SDNCs 140a-c.

As shown in FIG. 1, each OF module 120a-e is connected to one of OF modules 150a-c during normal operation, but each OF module 150a-c can communicate with multiple ones of OF modules 120a-e. For example, as shown in FIG. 1, OF modules 120a-b can be connected to OF module 150a in SDNC 140a, OF modules 120c-d can be connected to OF module 150b in SDNC 140b, and OF module 120e can be connected to OF module 150c in SDNC 140c. Due to various events indicated through messages, explained further below, the respective DPNs 110a-e can switch connections to different SDNCs 140a-c of the cluster. For example, FIG. 1 illustrates that OF module 120b can switch connections from OF module 150a (solid line) to OF module 150b (dashed line) Likewise, FIG. 1 illustrates that OF module 120d can switch connections from OF module 150b (solid line) to OF module 150c (dashed line). Nevertheless, due to the presence of load balancer 135, the respective DPNs are only aware of connecting to cluster 130 rather than individual SDNCs 140a-c.

The OF protocol supports three message types, each with multiple sub-types. Controller-to-switch messages are initiated by the controller and used to directly manage or inspect the state of the switch. These include messages such as modify-flow entry, modify-group-entry, etc. Symmetric messages are initiated either by the switch or the controller and sent without solicitation. These include messages such as Hello (exchanged between the switch and controller upon connection startup) and Echo request, which can be initiated by the switch or the controller and requests a reply from the other entity. Echo request/reply are mainly used to verify the liveness of a controller-switch connection, and/or to measure the connection's latency or bandwidth.

The third type, asynchronous messages, are initiated by the switch (e.g., unsolicited by the controller) and update the controller about network events and changes to the switch state. For example, switches send asynchronous messages to controllers to denote a packet arrival or switch state change. Some particular asynchronous message types include:

Packet-in: Transfers the control of a packet to the controller. For all packets forwarded to the CONTROLLER reserved port using a flow entry or the table-miss flow entry, a packet-in message indicating or associated with an event is always sent to the controller.

Flow-Removed: Informs the controller about the removal of a flow entry from a flow table. They are generated as the result of: 1) controller flow delete request; or 2) the switch flow expiry process when one of the flow timeouts is exceeded, or other reasons.

Port-status: Informs the controller of a change on a port. The switch is expected to send port-status messages to controllers as port configuration or port state changes. These events include change in port configuration events, for example if it was brought down directly by a user, and port state change events, for example if the link went down.

Another feature of the ODL controller cluster is a distributed data store, shown as global data store (GDS) 170 in FIG. 1. All provisioning messages (coming from northbound interface such as OpenStack) and network events messages (coming from southbound interface such as OF) are stored in this data store. Although transactions to this data store can be initiated on any controller cluster node, the transaction request is send to a leader of the data store shard/partition. This leader commits the transaction to the data store. Once a transaction is committed to the data store, the data store change-notification is distributed to other components (that had registered a listener) in ODL cluster. These change notifications in turn trigger further processing in the cluster, e.g., the modifications to the data store drive the event message processing/handling in the controller. In order to facilitate this processing/handling, the SDNCs 140a-c can have respective message queues 160a-c, in which event messages needed to be processed by a particular SDNC 140a-c are queued while awaiting processing. When a particular message reaches the head of the queue, it is dequeued for processing by the corresponding SDNC. As shown in FIG. 1, message queues 160a-c can be associated with GDS 170 (e.g., portions of GDS 170 can be allocated for the respective queues). In other embodiments, message queues 160a-c can be physically separated from GDS 170 (e.g., each queue can be part of its respective SDNC).

In case of fault scenarios such as when a switch restarts and connects to a different SDNC instance, the processing order of event messages by ODL controller cluster may be different from the actual (e.g., temporal) order of the events. As an example, consider the arrangement shown in FIG. 1. DPN 110b is initially connected to SDNC 140a (e.g., via OF modules 120b and 150a) but after DPN 110b restarts, it can be connected to SDNC 140b (e.g., via OF module 150b) due to a policy of load balancer 135, for example. DPN 110b can affect this change by sending a DPN-DISCONNECT message, which is temporarily stored in queue 160a, followed by a DPN-CONNECT message that is temporarily stored in queue 160b. If the two messages spend approximately the same amount of time in queues 160a-b, the DPN-DISCONNECT message is very likely to be processed before the DPN-CONNECT message, as expected.

In some situations, however, the amount of time in the respective queues can differ significantly due to, e.g., the number of preceding messages in the respective queue and/or the complexity in processing those preceding messages. As an example, consider the case where a relatively large number of messages from DPN 110a are preceding the DPN-DISCONNECT message from DPN 110b in queue 160a, while a much smaller number of messages from DPN 110c (e.g., zero messages) are preceding the DPN-CONNECT message from DPN 110b in queue 160b. As such, SDNC 140a will process the DPN-DISCONNECT message after SDNC 140b processes the DPN-CONNECT message, causing the controller cluster to erroneously determine that DPN 110b is disconnected rather than connected.

Accordingly, it can be beneficial to address these problems to provide error-free operation of SDN controller clusters configured in this manner.

SUMMARY

Accordingly, to address at least some of such issues and/or problems, certain exemplary embodiments of apparatus, devices, methods, and computer-readable media according to the present disclosure can generate an incremental incarnation identifier (IID) for a DPN connection at time of DPN re-connect, tagging incoming messages with this IID, and subsequently checking the values of the tagged IIDs against the latest value of the DPN's global IID before processing the tagged messages. In this manner, exemplary embodiments of methods, systems, devices, and computer-readable media according to the present disclosure can eliminate and/or significantly reduce out-of-order message processing such that SDN controllers can correctly determine the connection status of DPNs, thereby vastly outperforming conventional methods, techniques, and systems in various known applications, including exemplary applications discussed herein.

In certain exemplary embodiments, it is possible to provide methods and/or procedures for processing connection requests from a DPN to a plurality of controller nodes configured in a cluster. The exemplary methods and/or procedures can include receiving, at a controller node, a connection request associated with a DPN, and determining whether a global IID associated with the DPN exists. Determining whether the global IID exists can comprise interrogating a global data store accessible to the plurality of controller nodes. If it is determined that the global IID associated with the DPN exists, a value of the global IID associated with the DPN is incremented. Otherwise, if it is determined that a global IID associated with the DPN does not exist, the DPN is associated with a global IID set with an initial value. The exemplary methods and/or procedures can also include storing the association between the DPN and the global IID with the one of the initial value and the incremented value.

The association between the DPN and the global IID with the one of the initial value and the incremented value can be stored in a global data store accessible to the plurality of controller nodes. The exemplary methods and/or procedures can also include storing, at the controller node, a local IID associated with the DPN, wherein the local IID is set with the one of the initial value and the incremented value of the global IID.

The exemplary methods and/or procedures can also include establishing the connection between the DPN and the controller node. In some exemplary embodiments, the cluster of controller nodes can be arranged in a high-availability configuration comprising a master node and one or more slave nodes, and the connection request can relate to selection of a different controller node as the master node with respect to the DPN.

Other exemplary embodiments include methods and/or procedures for handling messages from one or more DPNs to a plurality of controller nodes configured in a cluster. The exemplary methods and/or procedures can include receiving, at a first controller node of the cluster, a message from a DPN, and tagging the message with an IID associated with the DPN. The exemplary methods and/or procedures can also include performing IID handling of the message, where the IID handling comprises comparing a value of the IID of the tagged message with a value of a global IID associated with the DPN, and if the value of the IID of the tagged message is less than the value of the global IID, the tagged message is discarded. Otherwise, if the value of the IID of the tagged message is not less than the value of the global IID, the tagged message is processed.

In some embodiments, the exemplary methods and/or procedures can also include sending the tagged message to be stored in a queue, and subsequently retrieving the tagged message from the queue prior to performing the IID handling. For example, the message can be sent to, and retrieved from, a global data store associated with the cluster. These exemplary embodiments can also include sending a plurality of other messages from one or more further DPNs for storage in the queue ahead of the tagged message.

In some exemplary embodiments, the IID associated with the DPN can be stored at the controller node. In other exemplary embodiments, the tagging of the message can be performed by the DPN based on an IID stored at the DPN. In such exemplary embodiments, the IID handling can be performed by the first controller node.

The exemplary methods and/or procedures can also include operations performed by a second controller node of the cluster, including receiving a switch connection request from the DPN, incrementing the value of the global IID associated with the DPN, and storing, in a global data store associated with the cluster, the global IID with the incremented value. The operations performed by the second controller node can occur after the first controller node tags the message and before the first controller node performs IID handling of the tagged message. Storing the global IID with the incremented value can comprise sending the global IID with the incremented value to a third controller node, of the cluster, configured as a leader of the global data store.

In some exemplary embodiments, the IID handling can be performed by a second controller node. Other exemplary embodiments can include, if the value of the IID of the tagged message is less than the value of the global IID, discarding any established connection between the first controller node and the DPN.

In some exemplary embodiments, the cluster can be arranged in a high-availability configuration comprising a master controller node and one or more slave controller nodes.

Other exemplary embodiments include a controller node, or cluster of controller nodes, configured to perform operations corresponding to the exemplary methods and/or procedures described above. Other exemplary embodiments include non-transitory, computer-readable media storing program instructions that, when executed by at least one processor, configure a controller node, or cluster of controller nodes, to perform operations corresponding to the exemplary methods and/or procedures described above.

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

Further objects, features and advantages of the present disclosure will become apparent from the following detailed description taken in conjunction with the accompanying Figures showing illustrative embodiments, in which.

While the present disclosure will now be described in detail with reference to the figures, it is done so in connection with the illustrative embodiments and is not limited by the particular embodiments illustrated in the figure(s) or in the appended claims.

DETAILED DESCRIPTION

Exemplary embodiments of the present disclosure address the above-described problems by generation of an incremental incarnation identifier (IID) for the DPN connection at time of DPN re-connect. This DPN IID is maintained within the controller cluster (e.g., in a central or global data store) on a per DPN basis, and a value of the DPN IID is incremented each time a DPN reconnects. The SDN controller instance that maintains the OF connection towards the DPN also retains a local copy of the DPN IID (e.g., within a local data store). All messages coming from a DPN can be tagged with this locally-stored IID by the SDN controller maintaining the connection. Once a message is ready for handling, the value of its tagged IID is checked against the latest value of the DPN IID stored in the global data store. All messages corresponding to an older IID value for the particular DPN are discarded and not processed. Accordingly, out-of-order message processing can be eliminated or significantly reduced such that SDN controllers can correctly determine the connection status of DPNs.

Figure 2:
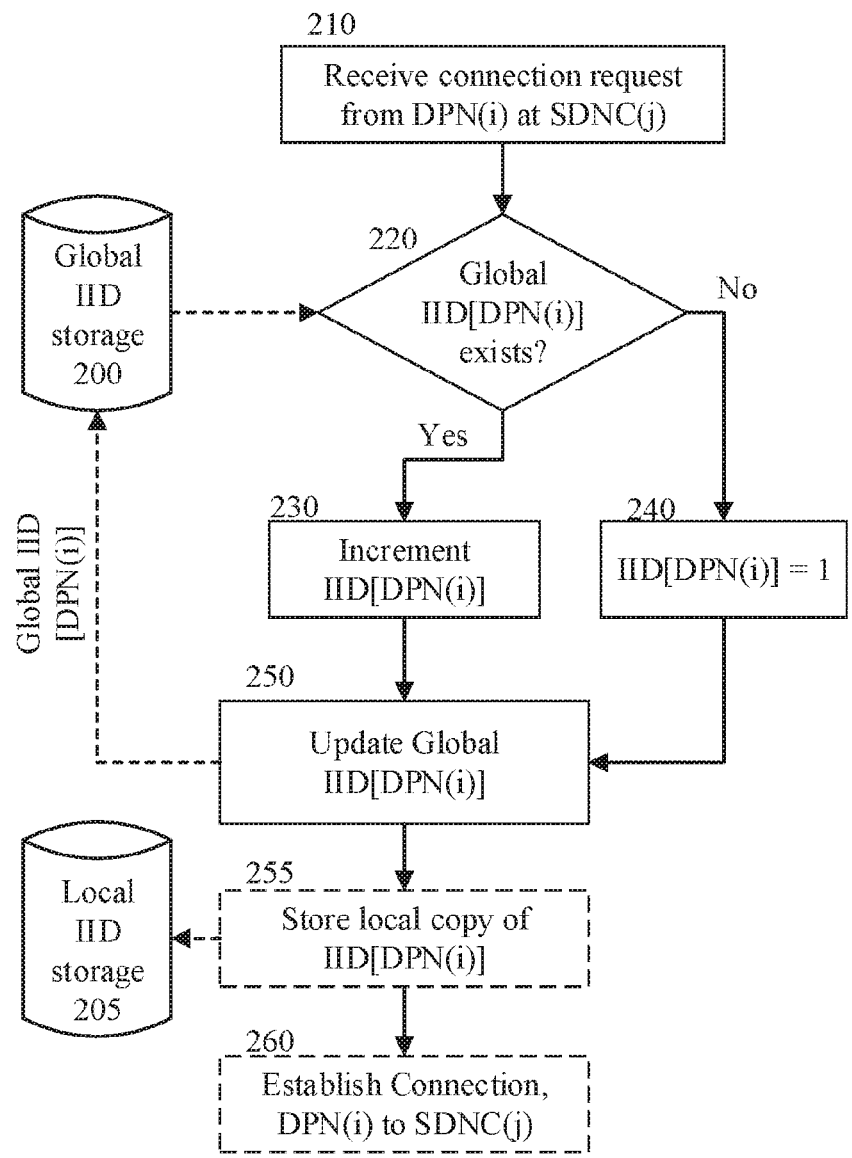
FIG. 2 is a flow diagram of operations comprising an exemplary method and/or procedure for processing connection requests from one or more DPNs to a plurality of controller nodes (e.g., SDN controllers) configured in a cluster, according to one or more exemplary embodiments of the present disclosure.

FIG. 2 shows a flow diagram of an exemplary method and/or procedure for processing connection requests from a data-plane node (DPN) to a plurality of controller nodes (e.g., SDN controllers) configured in a cluster, according to one or more exemplary embodiments of the present disclosure. The exemplary method illustrated in FIG. 2 can be implemented, for example, in one or more controller node configured according to FIG. 5 (described below). Although the method is illustrated by blocks in the particular order of FIG. 2, this order is merely exemplary, and the steps of the method may be performed in a different order than shown by FIG. 2, and may be combined and/or divided into blocks having different functionality. Furthermore, the exemplary method and/or procedure shown in FIG. 2 is complementary to, and can be used in conjunction with, the exemplary method and/or procedure shown in FIG. 3 to provide improvements and/or solutions to problems described herein.

For example, in block 210, a controller node (e.g., SDNC (j)) of the cluster can receive a connection request associated with a data-plane node (DPN) (e.g., DPN(i)). The connection request can be provided, for example, via a load balancing module such as described above with respect to FIG. 1. In block 220, the controller node can determine whether a global incarnation identifier (IID) associated with the DPN exists. In some exemplary embodiments, the controller node can determine whether the global IID exists by interrogating a global data store accessible to the plurality of controller nodes.

If the global IID associated with the DPN is determined to exist, operation proceeds to block 230, where the controller node increments the global IID value. On the other hand, if a global IID associated with the DPN is determined not to exist, operation proceeds to block 240, where the controller node establishes an association between the DPN and a global IID set with an initial value (e.g., one).

In either case, operation proceeds to block 250, where the controller node stores the association between the DPN and the global IID with the one of the incremented and the initial value, depending on whether block 250 was reached via block 230 or block 240, respectively. In some exemplary embodiments, the association between the DPN and the global IID with the one of the incremented and the initial value can be stored in the global data store (e.g., Global IID storage 200). In block 255, the controller node can also retain and store a local IID associated with the DPN, where the local IID is set with the one of the initial global IID value and the incremented global IID value. In some exemplary embodiments, the local IID can be stored in the local data store (e.g., Local IID storage 205).

In some exemplary embodiments, operation can then proceed to block 260, where the controller node can establish the requested connection with the DPN. In some exemplary embodiments, the cluster of controller nodes can be arranged in a high-availability configuration comprising a master node and one or more slave nodes. In such embodiments, the connection request can relate to selection of a different controller node as the master node with respect to the DPN.

Figure 3:
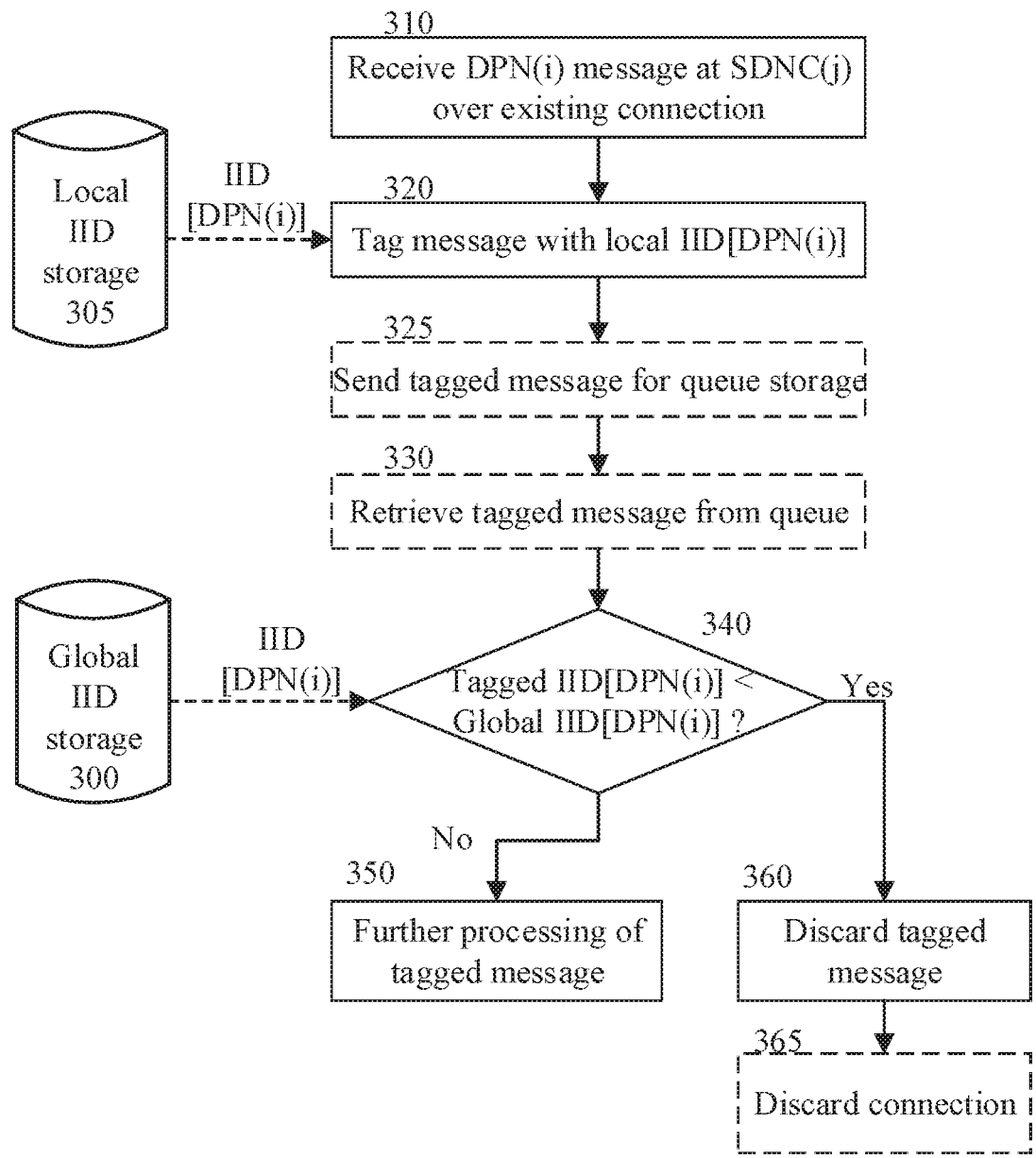
FIG. 3 is a flow diagram of operations comprising an exemplary method and/or procedure for handling messages from one or more DPNs to a plurality of controller nodes (e.g., SDN controllers) configured in a cluster, according to one or more exemplary embodiments of the present disclosure.

FIG. 3 shows a flow diagram of an exemplary method and/or procedure for handling messages (indicating, e.g., events) from one or more data-plane nodes (DPNs) to a plurality of controller nodes (e.g., SDN controllers) configured in a cluster, according to one or more exemplary embodiments of the present disclosure. The exemplary method illustrated in FIG. 3 can be implemented, for example, in a controller node configured according to FIG. 5 (described below). Although the method is illustrated by blocks in the particular order of FIG. 3, this order is merely exemplary, and the steps of the method may be performed in a different order than shown by FIG. 3, and may be combined and/or divided into blocks having different functionality. Furthermore, the exemplary method and/or procedure shown in FIG. 3 is complementary to, and can be used in conjunction with, the exemplary method and/or procedure shown in FIG. 2 to provide improvements and/or solutions to problems described herein.

For example, in block 310, a first controller node (e.g., SDNC(j)) of the cluster can receive a message (indicating, e.g., an event) from a DPN (e.g., DPN(i)). In block 320, the message can be tagged with an incarnation identifier (IID) associated with the DPN. In some exemplary embodiments, the IID associated with the DPN is stored at the first controller node, e.g., in local IID storage area 305 as shown in FIG. 3. In other exemplary embodiments, tagging the message can be performed by the DPN based on an IID stored at the DPN.

In block 325, the first controller node can send the tagged message to be stored in a queue. In block 330, the first controller node can subsequently retrieve the tagged message from the queue. In some exemplary embodiments, the queue can be part of a global data store associated with the cluster, such that the tagged message can be sent to, and subsequently retrieved from, the global data store. In some exemplary embodiments, a second controller node, rather than the first controller node, can perform the retrieval operation of block 330.

The operation of blocks 340-360, also referred to as "IID handling," can then be performed by one of the controller nodes of the cluster. For example, the IID handling operations can be performed by the controller node that performed the retrieval operation of block 330, e.g., the first or the second controller node. In block 340, the controller node compares a value of the IID of the retrieved tagged message with a value of a global IID associated with the DPN (e.g., a global IID received/retrieved from Global IID storage area 300 as shown in FIG. 3). If the value of the IID of the tagged message is not less than the value of the global IID, operation proceeds to block 350 where the controller node processes the tagged message. Processing of the tagged message may include, for example, sending notice of the event to another node, routing a packet, reconfiguring a flow table, updating port status or configuration, etc.

Otherwise, if the value of the IID of the tagged message is less than the value of the global IID, operation proceeds to block 360 where the controller node discards the tagged message. In some exemplary embodiments, the controller node can also discard the connection with the DPN (block 365). The condition leading to blocks 360-365 can occur, for example, if the DPN times out waiting for the message to be processed by the first controller node. In such case, the DPN can send a switch connection request to the cluster, which can be received by a second controller node based on the load-balancing principles briefly described above. In such case, the second controller node can perform the exemplary operations described above with respect to FIG. 2. These operations can occur after the first controller node tags the message but before the first controller node performs IID handling of the message, which can result in the IID mismatch condition leading to blocks 360-365 in FIG. 3.

Figure 4:
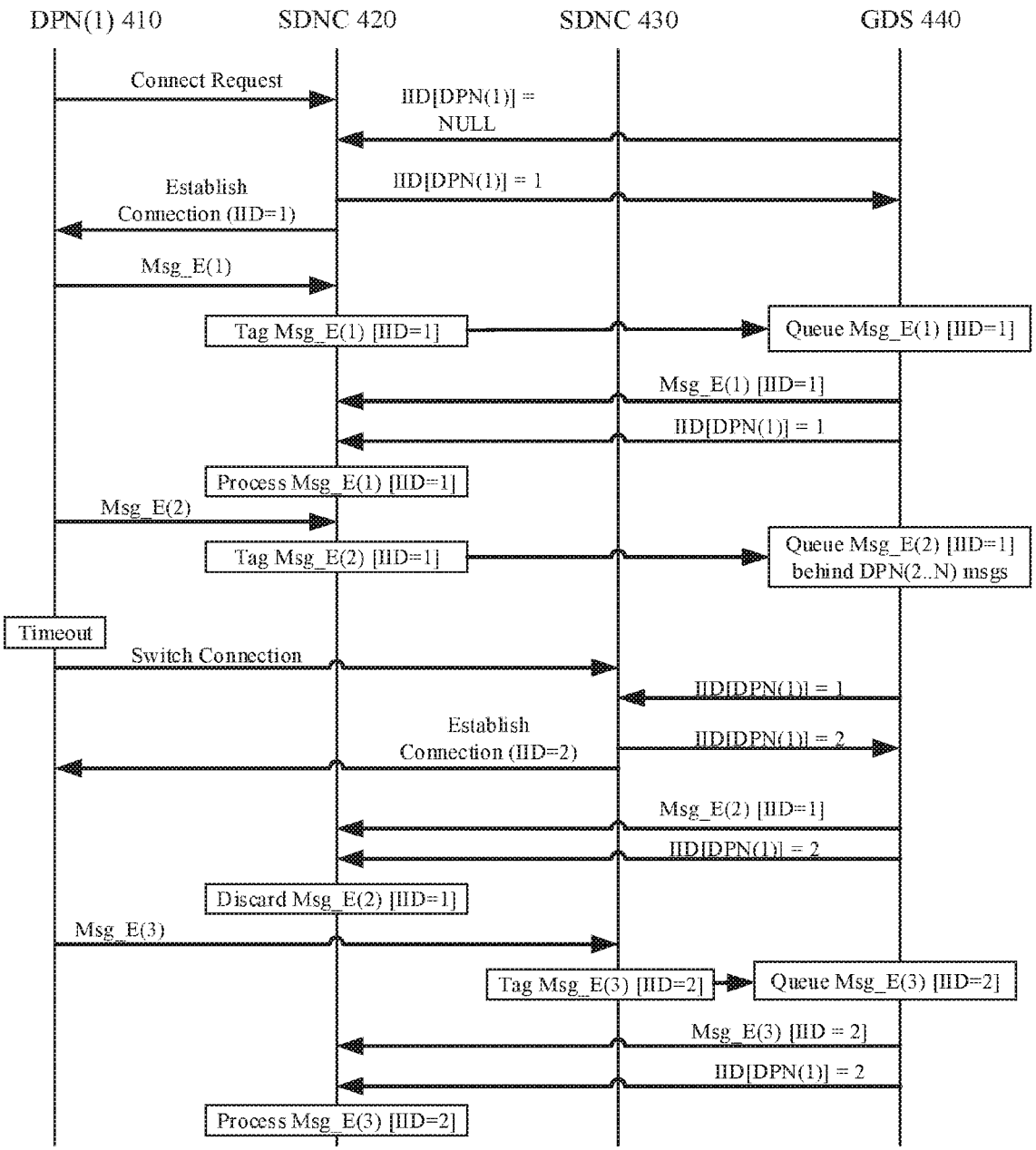
FIG. 4 is a flow diagram of exemplary operations in a controller cluster, according to one or more exemplary embodiments of the present disclosure.

These principles are further illustrated in FIG. 4, which shows a flow diagram of operations in a controller cluster, according to one or more exemplary embodiments of the present disclosure. For example, the flow diagram of FIG. 4 illustrates the principles of FIGS. 2 and 3 in the exemplary embodiment of an Open Daylight (ODL) controller cluster comprising a DPN (DPN(1) 410), a first SDN Controller (SDNC 420), a second SDNC 430, and a cluster global data store (GDS 440).

Initially, DPN(1) 410 sends a Connect Request message (e.g. DPN-CONNECT) to the cluster, which assigns the Connect Request message to SDNC 420 according to a load-balancing protocol, as discussed above. Upon receiving the Connect Request message, SDNC 420 interrogates GDS 440 to determine whether a global incarnation identifier (IID) associated with DPN(1) 410 exists. As shown in FIG. 4, GDS 440 returns a value IID[DPN(1)]=NULL, indicating that no such global IID exists in GDS 440. In response, SDNC 420 initializes a global IID with an initial value IID[DPN(1)]=1, and sends to GDS 440 (e.g., via a message or write command) an association between the DPN(1) and the global IID set with this initial value. SDNC 420 also retains a copy of this association in its local data store (not illustrated). In some exemplary embodiments, SDNC 420 can send a message to DPN(1) to establish the requested connection.

Subsequently, SDNC 420 receives a message from DPN (1) 410 indicating an event, wherein the message is labeled as "Msg_E(1)" in FIG. 4. SDNC 420 retrieves the IID[DPN (1)]=1 from the local data store and tags Msg_E(1) with the local IID with the value, i.e., IID=1. SDNC 420 then sends the tagged message to a queue, e.g., a queue that is part of the GDS 440, where, for example, it can be queued for further handling. In this example, tagged Msg_E(1) is queued for handling by SDNC 420, and reaches the front of the queue relatively quickly due to SDNC 420's relatively light processing load. Although the message queue is part of the GDS 440 in the example of FIG. 4, in other embodiments, the tagged messages are queued in a data store that is separate from the GDS 440 but is still accessible by the controller nodes of the cluster.

Upon reaching the front of the queue, Msg_E(1) tagged with IID=1 is de-queued and sent to (and/or retrieved by) SDNC 420 for handling. In some embodiments, upon receiving tagged Msg_E(1), SDNC 420 interrogates GDS 440 to determine the current value of the global IID associated with DPN(1). In this case, global IID[DPN(1)]=1 since DPN(1) has made no connection changes since Msg_E(1) was tagged and sent to GDS 440. SDNC 420 compares the IID value of the tagged message with the global IID value (comparison not illustrated in FIG. 4) and since they are equal (i.e., representing the same incarnation of DPN(1) connection), processes the tagged message Msg_E(1). In some embodiments, DPN(1) 410 receives an acknowledgement (e.g., from SDNC 420), or is able to make a determination, that the tagged message Msg_E(1) was processed (not illustrated in FIG. 4).

Subsequently, SDNC 420 receives another message from DPN(1) 410 indicating a second event, wherein the message is labeled as "Msg_E(2)" in FIG. 4. SDNC 420 retrieves the IID[DPN(1)]=1 from the local data store and tags Msg_E(2) with the local IID associated with DPN(1), i.e., IID=1. SDNC 420 then sends the tagged Msg_E(2) to a queue, e.g., a queue that is part of the GDS 440, where, for example, it can be queued for further handling. In this example, tagged Msg_E(2) is also queued for handling by SDNC 420. Prior to receiving tagged Msg_E(2), however, SDNC 420 receives (not illustrated) a plurality of other messages from other DPNs connected to the cluster via SDNC 420. Accordingly, tagged Msg_E(2) is placed in SDNC 420's message queue behind these other messages (indicating, e.g., events) to await handling.

When DPN(1) 410 receives no indication that tagged Msg_E(2) has been processed after waiting a predetermined period, DPN(1) 410 times out the current connection to the cluster via SDNC 420. DPN(1) 410 then sends a Switch Connection message to the cluster, which is assigned to SDNC 430 according to the prevailing load-balancing policy of the cluster. Upon receiving the Switch Connection message, SDNC 430 interrogates GDS 440 to determine whether a global incarnation identifier (IID) associated with DPN(1) 410 exists. As shown in FIG. 4, GDS 440 returns a non-null value (e.g., IID[DPN(1)]=1) indicating global IID existence. SDNC 430 then increments the value of the global IID and sends to GDS 440 (e.g., via a message or write command) a new or updated association between DPN(1) and the global IID with this incremented value (e.g., IID[DPN(1)]=2). SDNC 430 also retains a copy of this association in its local data store (not illustrated). In some exemplary embodiments, SDNC 430 can also send a message to DPN(1) to establish the requested connection.

Upon reaching the front of SDNC 420's message queue, Msg_E(2) tagged with IID=1 is de-queued and sent to (and/or retrieved by) SDNC 420 for handling. In some exemplary embodiments, upon receiving tagged Msg_E(2), SDNC 420 interrogates GDS 440 to determine the current value of the global IID associated with DPN(1). In this case, global IID[DPN(1)]=2 due to DPN(1)'s earlier connection change. SDNC 420 compares the IID value of the tagged message with the global IID value (comparison not illustrated in FIG. 4) and since the value of the local IID is less (representing an earlier incarnation of DPN(1) connection), discards the tagged message Msg_E(2).

SDNC 430 receives a message from DPN(1) 410 indicating a third event, wherein the message is labeled as "Msg_E(3)" in FIG. 4. SDNC 430 retrieves the IID[DPN(1)]=2 from the local data store and tags Msg_E(3) with the local IID, i.e., IID=2. SDNC 430 then sends the tagged message to a queue, e.g., a queue that is part of the GDS 440, where, for example, it can be queued for further handling. In this example, tagged Msg_E(3) is queued for handling by a different SDNC than the SDNC that sent the corresponding tagged message to GDS 440 (i.e., SDNC 420 instead of SDNC 430).

Upon reaching the front of SDNC 420's message queue, tagged Msg_E(3) [IID=2] is de-queued and sent to (and/or retrieved by) SDNC 420 for handling. In some embodiments, upon receiving tagged Msg_E(3), SDNC 420 interrogates GDS 440 to determine the current value of the global IID associated with DPN(1). In this case, global IID[DPN(1)]=2 because DPN(1) has made no connection changes since Msg_E(3) was tagged and sent to GDS 440. SDNC 420 compares the IID value of the tagged message with the global IID value (comparison not illustrated in FIG. 4) and since they are equal (i.e., representing the same incarnation of DPN(1) connection), processes the tagged message Msg_E(3). In some embodiments, DPN(1) 410 receives an acknowledgement (e.g., from SDNC 420), or is able to make a determination, that the tagged message Msg_E(3) was processed (not illustrated in FIG. 4).

Figure 1:
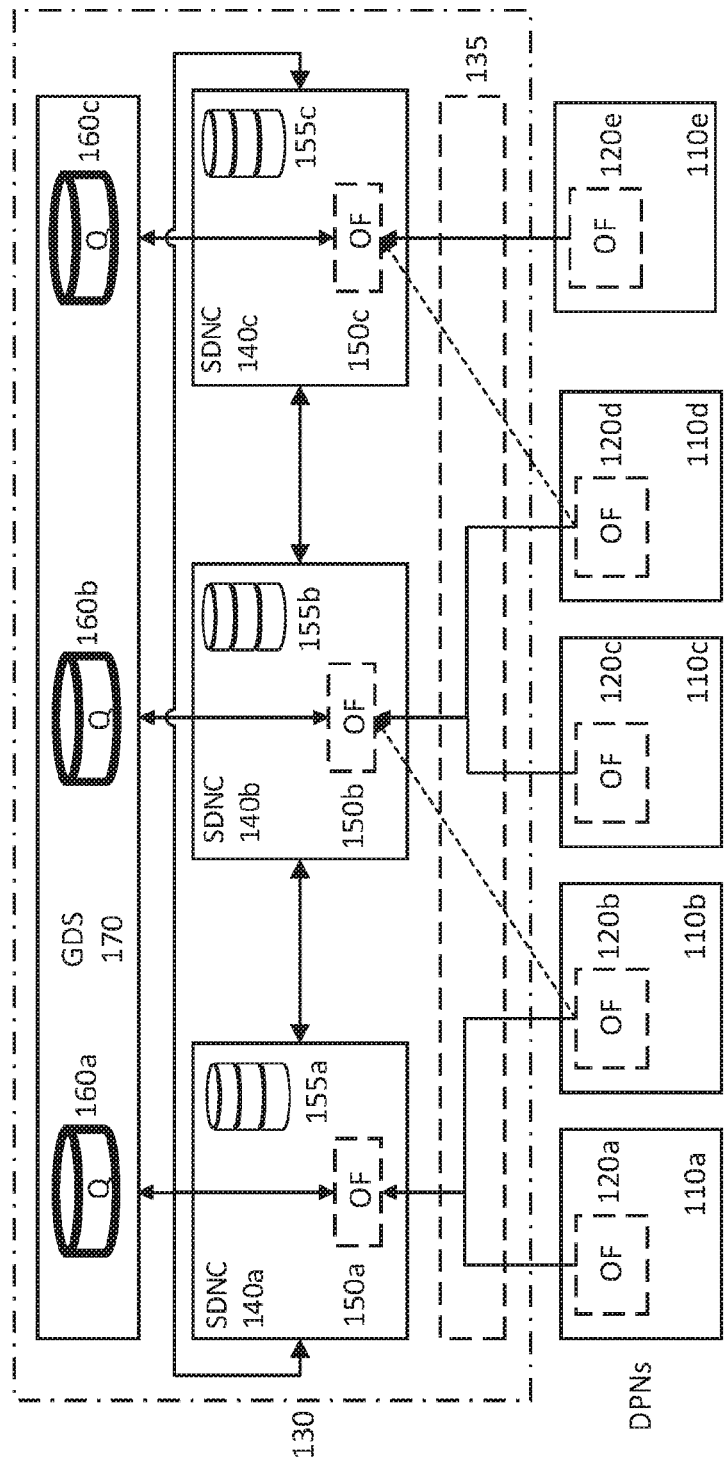
FIG. 1 is a block diagram of an exemplary SDN controller cluster in communication with a plurality of DPNs, according to one or more exemplary embodiments of the present disclosure.
Figure 5:
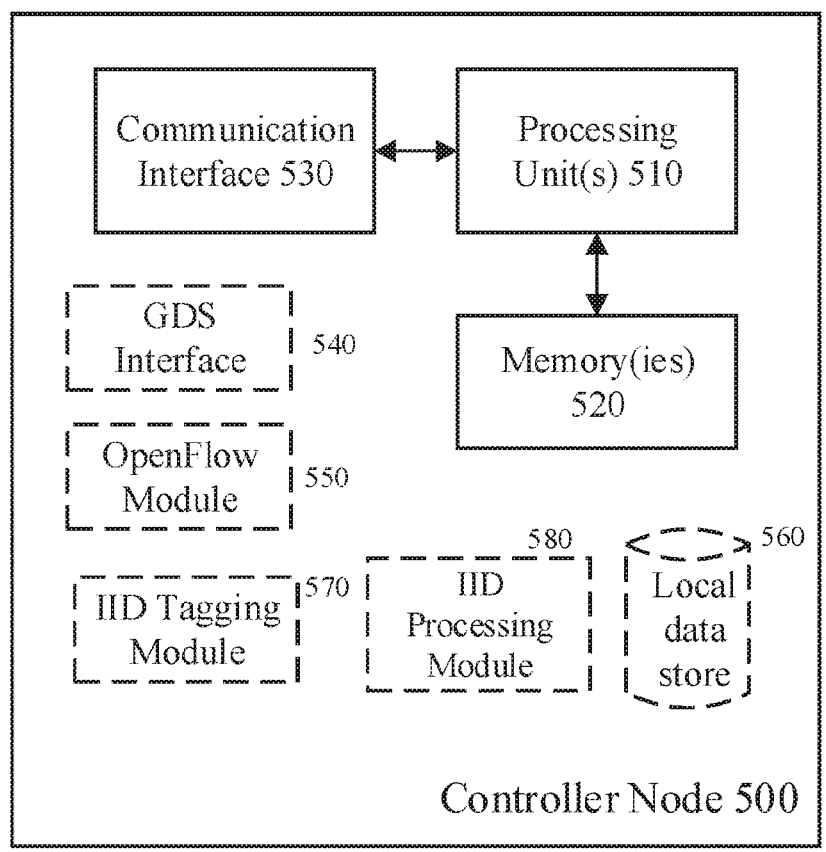
FIG. 5 is a block diagram of an exemplary controller node (e.g., SDN controller) according to one or more exemplary embodiments of the present disclosure.

Although various embodiments were described above in terms of exemplary methods and/or procedures, the person of ordinary skill will readily comprehend that such methods can be embodied by various combinations of hardware and software in various systems, communication devices, computing devices, control devices, apparatuses, network nodes, components, non-transitory computer-readable media, virtualized nodes and/or components, etc. FIG. 5 shows a block diagram of an exemplary controller node 500 utilizing certain embodiments of the present disclosure, including those described above with reference to other figures. In some exemplary embodiments, controller node 500 can comprise an SDN Controller configured, e.g., as part of an Open Daylight (ODL) HA cluster such as shown in FIG. 1.

Controller node 500 can comprise one or more processing units 510 which are operably connected to one or more memories 520. Persons of ordinary skill in the art will recognize that processing units 510 can comprise multiple individual processors (not shown), each of which can implement and/or provide a portion of the functionality described above. In such case, multiple individual processors may be commonly connected to memories 520, or individually connected to multiple individual memories. More generally, persons of ordinary skill in the art will recognize that various protocols and other functions of controller node 500 may be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware.

The connection(s) between processing units 510 and memories 520 can comprise parallel address and data buses, serial ports, or other methods and/or structures known to those of ordinary skill in the art. Memories 520 can comprise non-volatile memory (e.g., flash memory, hard disk, etc.), volatile memory (e.g., static or dynamic RAM), network-based (e.g., "cloud") storage, or a combination thereof. In addition, controller node 500 comprises a communication interface 530 usable to communicate with various other network devices and/or nodes, such as other controller nodes and/or DPNs, as illustrated in FIG. 1. Although communication interface 530 is described as a singular "interface," this is for convenience and skilled persons will recognize that communication interface 530 can comprise a plurality of interfaces, each for communication with external network devices and/or nodes as desired. For example, communication interface 530 can comprise one or more Gigabit Ethernet interfaces.

Memories 520 can comprise program memory usable to store software code (e.g., program instructions) executed by processing units 510 that can configure and/or facilitate controller node 500 to perform exemplary methods and/or procedures described herein. For example, memories 520 can comprise software code executed by processing units 510 that can facilitate and specifically configure controller node 500 to communicate with one or more DPNs via communication interface 530 using the OpenFlow protocol as described above. Such functionality is illustrated in FIG. 5 as OpenFlow Module 550.

Likewise, memories 520 can comprise software code executed by processing units 510 that can facilitate and specifically configure controller node 500 to perform the exemplary methods and/or procedures shown in FIG. 2-4. Such functionality is illustrated in FIG. 5 as Global Data Store (GDS) Interface 540, IID Tagging Module 570, and IID Processing Module 580. Memories 520 can further comprise software code executed by processing units 510 for other control and/or communication functions of controller node 500, including configuring and controlling various components such as communication interface 530. As a further example, memories 520 can comprise a Transmission Control Protocol (TCP)/IP stack usable for communication with other network nodes (e.g., DPNs).

Memories 520 can also comprise data memory usable for permanent, semi-permanent, and/or temporary storage of information for further processing and/or communication by processing units 510. For example, memories 520 can comprise a portion usable for local storage of IID information, which is illustrated in FIG. 5 as local data store 560. Although not shown in FIG. 5, in some exemplary embodiments, memories 520 can comprise a portion usable as a distributed global data store for the controller cluster. For example, if controller 500 is configured as a leader for a particular partition (also known as "shard") of the cluster global data store, memories 520 can comprise such a partition.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art. In addition, certain terms used in the present disclosure, including the specification, drawings and claims thereof, can be used synonymously in certain instances, including, but not limited to, e.g., data and information. It should be understood that, while these words, and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

The invention claimed is:

1. A method for processing connection requests from a data-plane node (DPN) to a plurality of controller nodes configured in a cluster, the method comprising:
  receiving, at a controller node, a connection request associated with a DPN;
  determining whether a global incarnation identifier (IID) associated with the DPN exists;
  if it is determined that the global IID associated with the DPN exists, incrementing a value of the global IID associated with the DPN;
  if it is determined that a global IID associated with the DPN does not exist, associating the DPN with a global IID set with an initial value; and
  storing the association between the DPN and the global IID with the one of the initial value and the incremented value, the association between the DPN and the global IID with the one of the initial value and the incremented value being stored in a global data store accessible to the plurality of controller nodes.

2. The method of claim 1, further comprising storing, at the controller node, a local IID associated with the DPN, wherein the local IID is set with the one of the initial value and the incremented value of the global IID.

3. The method of claim 1, further comprising establishing the connection between the DPN and the controller node.

4. The method of claim 1, wherein determining whether the global IID exists comprises interrogating a global data store accessible to the plurality of controller nodes.

5. The method of claim 1, wherein:
  the cluster of controller nodes is arranged in a high-availability configuration comprising a master node and one or more slave nodes; and
  the connection request relates to selection of a different controller node as the master node with respect to the DPN.

6. A method for handling messages from one or more data-plane nodes (DPNs) to a plurality of controller nodes configured in a cluster, the method comprising:
receiving, at a first controller node of the cluster, a message from a DPN;
tagging the message with an incarnation identifier (IID) associated with the DPN;
performing IID handling of the tagged message, the IID handling comprising:
comparing a value of the IID of the tagged message with a value of a global IID associated with the DPN;
if the value of the IID of the tagged message is less than the value of the global IID, discarding the tagged message;
if the value of the IID of the tagged message is not less than the value of the global IID, processing the tagged message; and
the method further comprising, at a second controller node of the cluster:
receiving a switch connection request from the DPN;
incrementing the value of the global IID associated with the DPN; and
storing, in a global data store associated with the cluster, the global IID with the incremented value, storing the global IID with the incremented value comprising sending the global IID with the incremented value to a third controller node, of the cluster, configured as a leader of the global data store.

7. The method of claim 6, further comprising:
sending the tagged message to be stored in a queue; and
subsequently retrieving the tagged message from the queue prior to performing the IID handling.

8. The method of claim 7, wherein the tagged message is sent to, and retrieved from, a global data store associated with the cluster.

9. The method of claim 7, further comprising sending a plurality of other messages from one or more further DPNs for storage in the queue ahead of the tagged message.

10. The method of claim 6, wherein tagging the message is performed by the DPN based on an IID stored at the DPN.

11. The method of claim 6, wherein the IID associated with the DPN is stored at the first controller node.

12. The method of claim 11, wherein the IID handling is performed by the first controller node.

13. The method of claim 12, wherein:
the operations performed by the second controller node occur after the first controller node tags the message and before the first controller node performs IID handling of the tagged message.

14. The method of claim 6, wherein the IID handling is performed by a second controller node.

15. The method of claim 6, further comprising, if the value of the IID of the tagged message is less than the value of the global IID, discarding any established connection between the first controller node and the DPN.

16. The method of claim 6, wherein the cluster is arranged in a high-availability configuration comprising a master controller node and one or more slave controller nodes.

17. A controller node configured, as one of a plurality of controller nodes configured in a cluster, to process connection requests from one or more data-plane nodes (DPNs), the controller node comprising:
at least one processing unit; and
at least one memory storing computer-executable instructions that, when executed by the at least one processing unit, configure the controller node to:
receive a connection request associated with a data-plane node (DPN);
determine whether a global incarnation identifier (IID) associated with the DPN exists;
if it is determined that the global IID associated with the DPN exists, increment a value of the global IID associated with the DPN;
if it is determined that a global IID associated with the DPN does not exist, associate the DPN with a global IID set with an initial value; and
store the association between the DPN and the global IID with the one of the initial value and the incremented value, the association between the DPN and the global IID with the one of the initial value and the incremented value being stored in a global data store accessible to the plurality of controller nodes.

18. A controller node configured, as one of a plurality of controller nodes configured in a cluster, to handle messages from one or more data-plane nodes (DPNs), the controller node comprising:
at least one processing unit; and
at least one memory storing computer-executable instructions that, when executed by the at least one processing unit, configure the controller node to:
receive a message from a DPN;
tag the message with an incarnation identifier (IID) associated with the DPN;
perform IID handling of the tagged message, the IID handling comprising:
comparing a value of the IID of the tagged message with a value of a global IID associated with the DPN;
if the value of the IID of the tagged message is less than the value of the global IID, discarding the tagged message; and
if the value of the IID of the tagged message is not less than the value of the global IID, processing the tagged message,
receive a switch connection request from the DPN;
increment the value of the global IID associated with the DPN; and
store, in a global data store associated with the cluster, the global IID with the incremented value, storing the global IID with the incremented value comprises sending the global IID with the incremented value to the controller node, of the cluster, configured as a leader of the global data store.

* * * * *